United States Patent
Zoppas (12) 
(10) Patent No.: US 6,390,802 B1
(45) Date of Patent: May 21, 2002

(54) APPARATUS FOR PRODUCING CONTAINERS OF THERMOPLASTIC MATERIAL

(75) Inventor: Matteo Zoppas, Fontanafredda (IT)

(73) Assignee: SIPA S.p.A., Vittorio Veneto (IT)

( * ) Notice: Subject to any disclaimer, the term of this patent is extended or adjusted under 35 U.S.C. 154(b) by 0 days.

(21) Appl. No.: 09/701,614
(22) PCT Filed: May 17, 1999
(86) PCT No.: PCT/EP99/03397
§ 371 Date: Dec. 1, 2000
§ 102(e) Date: Dec. 1, 2000
(87) PCT Pub. No.: WO99/62692
PCT Pub. Date: Dec. 9, 1999

(30) Foreign Application Priority Data

Jun. 3, 1998 (IT) ......... PN98A0042

(51) Int. Cl.[7] .......... B29C 49/36; B29C 49/56
(52) U.S. Cl. ......... 425/540; 425/451.5; 425/541
(58) Field of Search ........... 425/540, 541, 425/451.5, 451.6, 534, 537

(56) References Cited

U.S. PATENT DOCUMENTS

| | | | |
|---|---|---|---|
| 2,750,625 A | * 6/1956 | Colombo | 425/540 |
| 3,624,672 A | 11/1971 | Spivy | |
| 3,669,595 A | * 6/1972 | Zippel et al. | 425/451.5 |
| 3,840,317 A | * 10/1974 | Koch et al. | 425/451.6 |
| 3,969,059 A | * 7/1976 | Michel | 425/541 |
| 4,752,206 A | * 6/1988 | Nowicki et al. | 425/540 |
| 5,225,216 A | 7/1993 | Barracchini et al. | 425/540 |

FOREIGN PATENT DOCUMENTS

| | | | |
|---|---|---|---|
| FR | 1430899 | | 5/1966 |
| FR | 1454842 | | 12/1966 |
| FR | 2413196 A | * | 7/1979 |

\* cited by examiner

Primary Examiner—Robert Davis
(74) Attorney, Agent, or Firm—Wenderoth, Lind & Ponack, L.L.P.

(57) ABSTRACT

Apparatus for blow molding hollow plastic bodies (7) comprising a plurality of pairs of mutually joinable half-molds (2, 4) capable of being opened and closed, associated to an appropriate rotary apparatus (10) carrying said half-molds (2, 4), a retrieval device adapted to remove the finished container (7) from the respective pair of half-molds (2) after the opening thereof, an opening and closing mechanism adapted to close the half-molds (2, 4) after the passage thereof through the position of the preform feeding mechanism, and to open them before the passage thereof through the position of the finished-container removal mechanism, in which said pairs of half-molds (2, 4) are constituted by a fixed half-mold (2) and a moving half-mold (4) that is capable of being opened from and closed against said fixed half-mold (2). In a preferred manner, said fixed half-molds (2) are linked to said rotary apparatus (10) and are arranged in a substantially vertical position, with the respective moving half-mold (4) adapted to be closed by accomplishing a substantially rotary movement about a horizontal axis of rotation.

19 Claims, 12 Drawing Sheets

APPARATUS FOR PRODUCING CONTAINERS OF THERMOPLASTIC MATERIAL

BACKGROUND OF THE INVENTION

The present invention refers to an improved apparatus for the production of containers made of thermoplastic material, in particular polyethylene terephthalate (PET) and polypropylene (PP), intended for use in applications employing them being filled with liquids at elevated temperatures and/or containing $CO_2$ (carbon dioxide) gas, provided with devices that enable the productivity of moulds during the blow moulding phase to be increased.

In particular, the present invention is particularly advantageous when the described devices are associated with a preform manufacturing apparatus included in a so-called single-stage plant, but can be advantageously used also in conjunction with apparatuses that are supplied with previously manufactured preforms and are solely intended to carry out a final blow moulding phase (ie. two-stage plants).

In a two-phase process, a previously produced preform or parison, which is in a substantially amorphous state, is heated up again to its preferred molecular orientation temperature, at which it is then blow-moulded into the desired shape. As used in this context, the term "two-stage process", or "double-stage process", shall be understood to cover any process that produces a preform or parison which must then be heated up from ambient temperature to the related blow-moulding temperature.

In contrast therewith, single-stage processes are so defined in that they are capable of forming the so-called preform, or parison, and transferring the preform from the injection mould or extrusion die (upon it having been allowed to cool down to some appropriate temperature) to a conditioning station, where it is allowed to level evenly at a temperature of preferred molecular orientation. The preform or parison is then transferred to a blow-moulding mould, in which it is finally moulded into its desired form. According to a prior-art technique, the cavities in which the preforms are injection moulded and the preform transferring and conditioning devices are arranged in an on-line configuration along with the blow-moulding moulds, so as to ensure an easier, more convenient handling of the preforms, the containers and the various members therewith associated.

According to such a construction principle, both preforms and finished containers are processed in successive groups, with the same processing and/or transferring operations occurring at the same time.

In particular, the blow moulding tools, the the moulds, are particularly critical in this connection, since with the increasing blow moulding pressure and the increase in the number of cavities contained in each pair of blow moulding platens, more rapid and powerful pumping stations are required. Furthermore, the increased total pressure produced by the bottles during blow moulding must be opposed by a corresponding greater mould clamping pressure.

Such a greater pressure, which can be estimated to amount to a clamping force exerted on the moulds in excess of 100,000 kgf, would require all mechanical and pneumatic organs intended to produce and withstand such a pressure to be sized accordingly, which generally means to a very burdensome extent.

Such a huge and, what's more, pulsating pressure, however, has a negative effect also on the resistance of the moulds themselves, which are not only exposed to a greater pressure, but have, at the same time, to be capable of withstanding such pressure over a much greater period, owing to the greater number of blow moulding gates, and this of course causes the rigidity thereof to become a critical factor. It also makes it easier for the moulds to warp outwardly, thereby affecting the bottle blow-moulding results in an easily understandable manner.

Furthermore, when use is made of blow moulding moulds provided with a large number of cavities, the time needed for all preforms to be transferred into the respective cavities increases in a proportional manner with a corresponding increase in the cycle time and a resulting reduction in the overall productivity of the plant.

In order to do away with such drawbacks, a largely known solution lies in the replacement of blow moulding moulds provided with a plurality of on-line cavities with a smaller number of individual moulds, ie. comprising a single respective blow moulding cavity, which are arranged along the periphery of a rotating carousel-like structure, such as for instance illustrated in WO 95/05933, WO 89/01400, U.S. Pat. Nos. 4,850,850 and 4,313,720.

In particular, WO 89/01400 teaches that the blow moulding half-moulds are adapted to open and close in a book-like manner about respective axes of rotation that are orthogonal to the plane on which the preforms and the finished containers move.

Such a solution, although effective in solving the afore cited problems, does not however go without some drawbacks that are summarized below:

a) the need arises for two half-moulds to be handled and driven, and this, of course, adds to the complexity of the structures and causes costs to rise;

b) the lateral rotary movement of both the half-moulds requires, of course, the availability of adequate lateral space, and this, of course, puts a penalty on the compactness of the plant;

c) the handling means provided must be able to introduce the preforms from the front zone of the half-moulds, as well as to again remove the respective finished containers from the same front zone, and this of course understandably adds significantly to the complexity of both construction and operation of the plant.

However, during operating tests carried out on some types of plants having the characteristics as recited in the appended claims, and made with the use of known techniques of more obvious and immediate choice, such as the use of a direct pneumatic control or electromagnetic actuators or means like a lever joint generally known as a toggle joint in the art, it has been observed that a number of problems tend to a arise in connection with the opening and closing, or clamping, of the moving half-mould, ie.:

the final closing and opening movement of the moving half-mould is an abrupt, not adequately slowed-down one, so that it may give rise to blows and clattering;

owing to the rapid wear-down of the mechanical organs and parts concerned (it should be noted that these must be able to operate on a contmuous-duty basis over very long periods of time), the duration of the machine life is significantly affected, ie. reduced, thereby giving rise to immediate problems of planned maintenance and/or repair work;

the noise generated by the entire system controlling and actuating the movement of the moving half-mould is in general quite high and tends to further increase owing the the above cited wear-down effect;

since the moving half-mould must perform an alternating opening and closing movement at a relatively high rate, vibrations are generated which tend to be transferred to the entire structure of the plant, and this has obviously a negative impact on the duration and the operation of the machine organs involved; furthermore, the final opening and closing phase of the moulds is an extremely short and therefore strongly accelerated phase, and this of course contributes to an increased level of the so induced vibrations; and for such accelerations to be obtained, over-sized movement control and driving organs must be used, but this fact not only has a negative effect on the level of the vibrations, but also, due to the greater extent of wear-down caused, to the ability of ensuring the desired precision standards over adequately long periods of time.

SUMMARY OF THE INVENTION

Based on these considerations, it therefore is a main purpose of the present invention to provide a blow-moulding apparatus of a plant for producing hollow bodies allowing for the productivity thereof to be increased through an accelerated handling of both preforms and finished containers, without incurring any of the afore mentioned drawbacks, which is capable of being easily implemented with the aid of readily available techniques and means and therefore is reasonably low-cost, reliable and preferably capable of being integrated with a preform production stage arranged upstream.

BRIEF DESCRIPTION OF THE DRAWINGS

This above arm, along with further features of the present invention, is reached in a blow-moulding apparatus having the characteristics as recited in the appended claims, and embodies itself in definite parts and arrangements of parts, as can be more readily understood from the detailed description of a preferred embodiment that is given below by way of non-limiting example with reference to the accompanying drawings, in which:

FIGS. 8A through 12A are schematic views of the locations on which forces concentrate, as well as the axes along which the forces acting on the actuation organs of FIGS. 8 through 12 concentrate;

DETAILED DESCRIPTION OF THE PREFERRED EMBODIMENT

Figure 1:
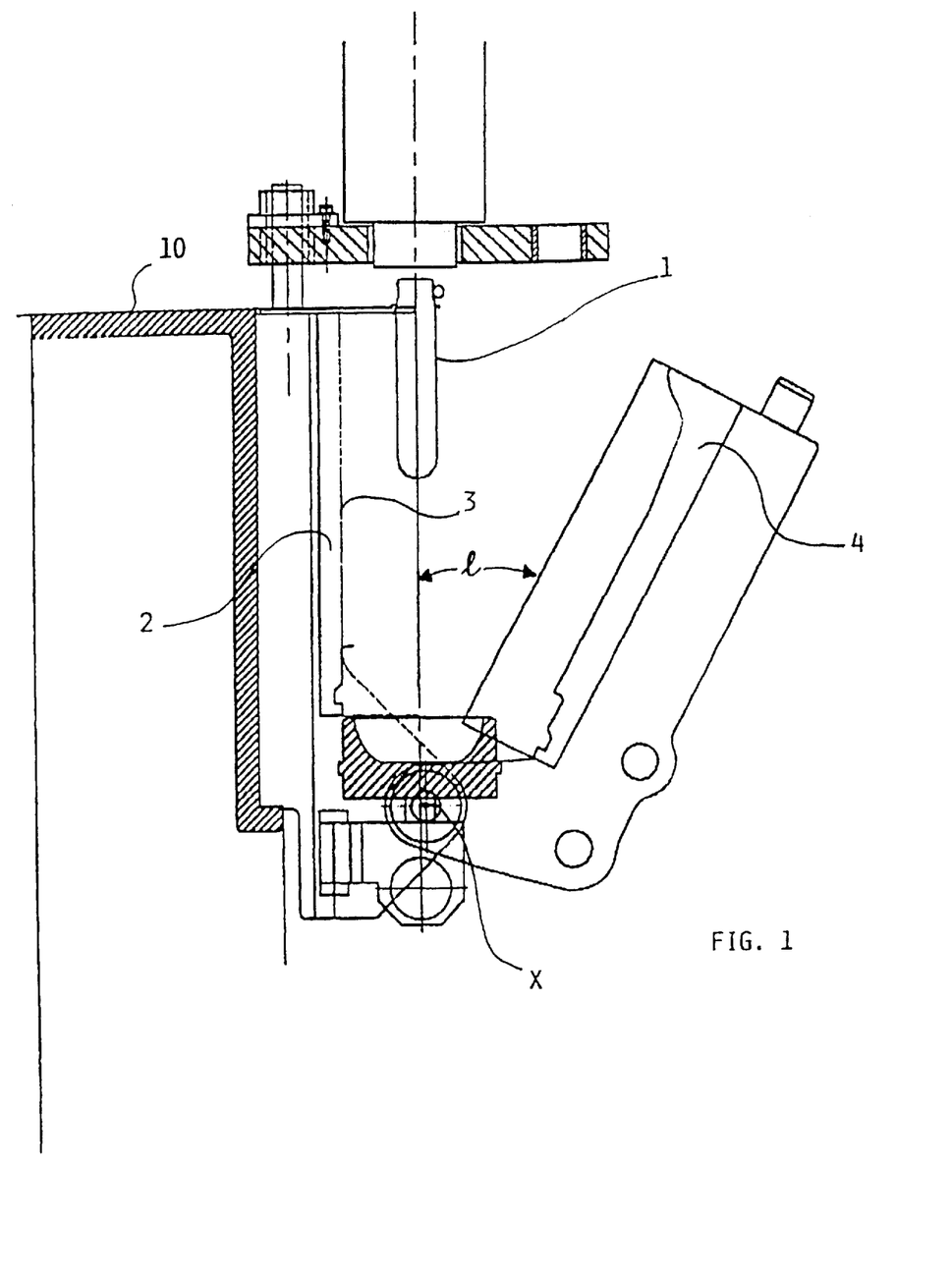
FIG. 1 is a side vertical-section view of a pair of half-moulds according to the present invention, shown at a closing angle enabling the preforms to be introduced therein.
Figure 2:
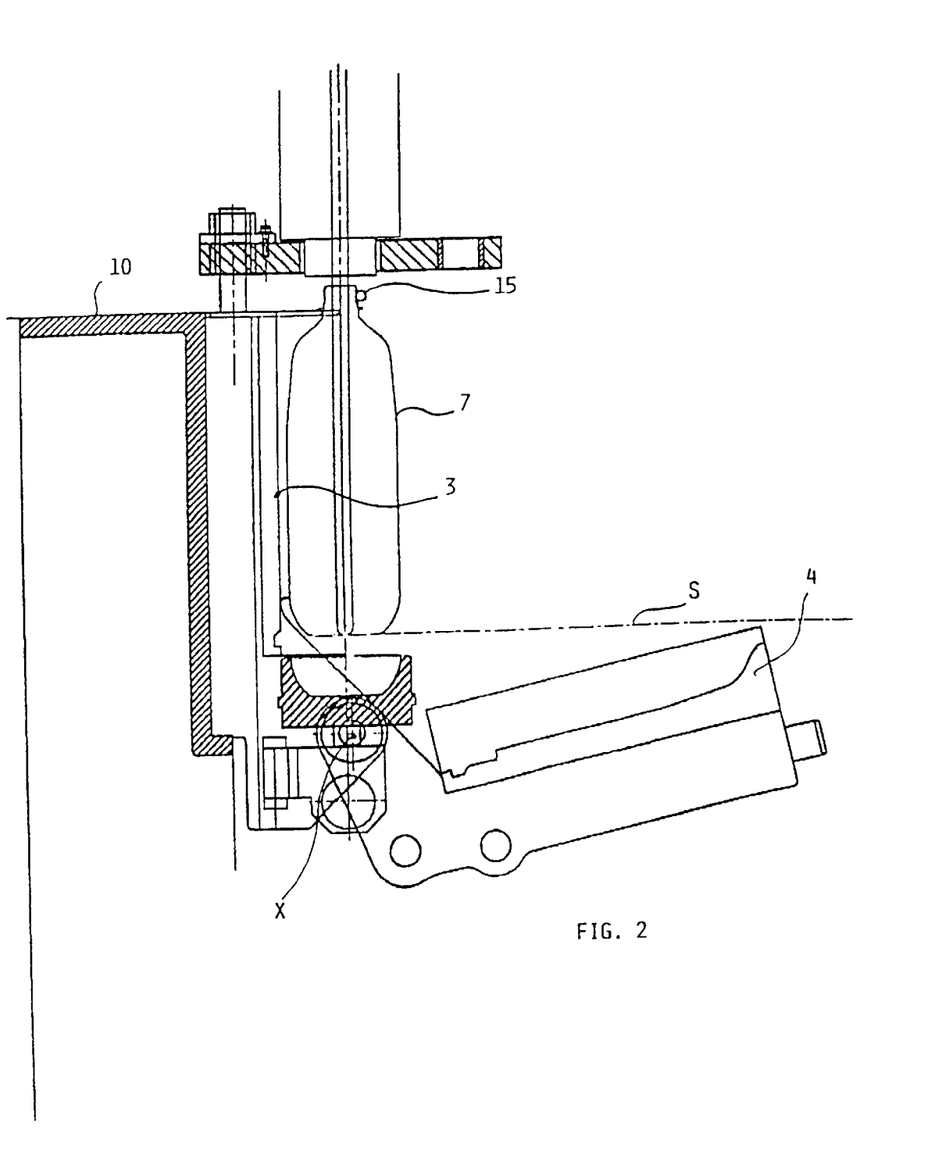
FIG. 2 is a side view similar to FIG. 1, however with the same half-moulds shown in a minimum opening position thereof enabling the blow-moulded container to be removed therefrom.
Figure 6:
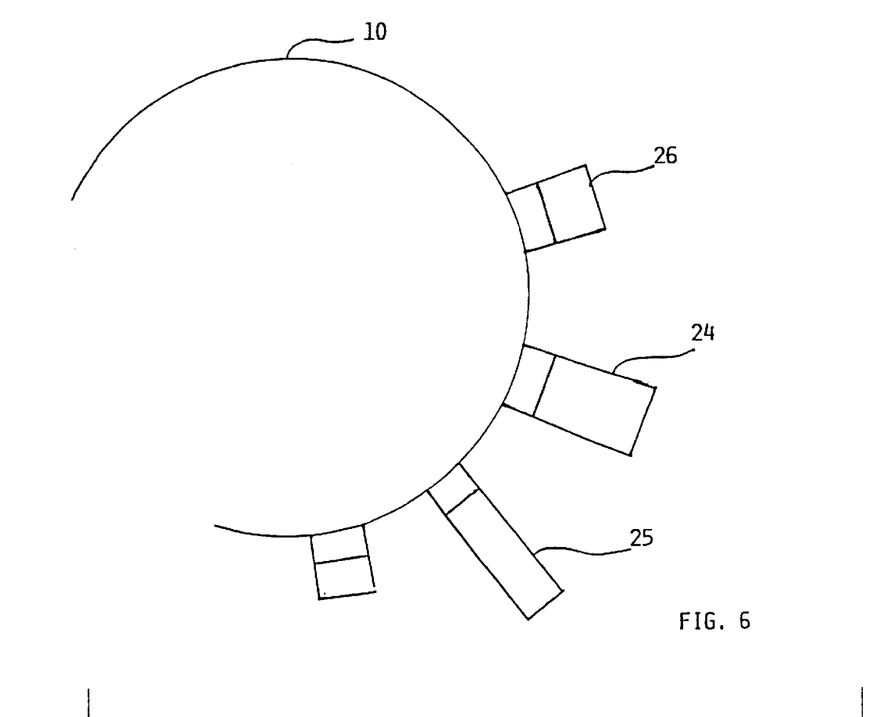
FIG. 6 is a schematic top view of the geometry and mutual arrangement of a plurality of moulds according to the present invention.

A main feature of the present invention lies in the use of pairs of half-moulds adapted to blow mould preforms 1 in view of converting them into finished containers 7. The half-moulds are essentially arranged as illustrated in FIGS. 1, 2 and 6 showing, respectively, a schematic side vertical-section view of a pair of half-moulds in a partially open state, a schematic side vertical-section view of the same half-moulds in an almost fully open state, and a schematic top view of the arrangement of moulds 24, 25, 26 according to the present invention, in a fully open state in the case of the moulds 24 and 25, and a fully closed state, in the case of the mould 26.

On an outer periphery of a per se known rotating carousel 10 there are applied a plurality of pairs of half-moulds, wherein one of such half-moulds 2 is fixed and firmly joined to the carousel, and is further arranged on a vertical plane, with its respective half-cavity facing outwardly and radially oriented with respect to the carousel 10, and the other half-mould 4 is movable with a rotary motion about an axis X arranged on the horizontal plane and hinged on a rotation device (not shown) so that, when raised into its closed position, it is moved into coupling exactly with the matching fixed half-mould 2 that is firmly joined to the carousel. In this way, therefore, the need actually arises for only the moving half-mould 4 to be actuated into closing and opening, since the other half-mould 2 is fixed and substantially firmly joined to the carousel.

Figure 3:
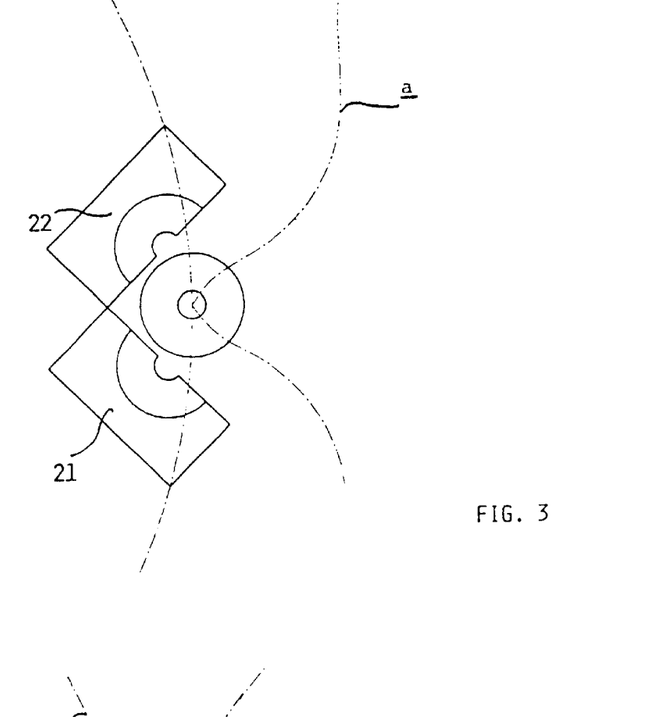
FIG. 3 is a schematic view of a path, as seen from above, followed by a preform to enter and to come out of a pair of half-moulds in a book-like open arrangement according to the prior air.
Figure 4:
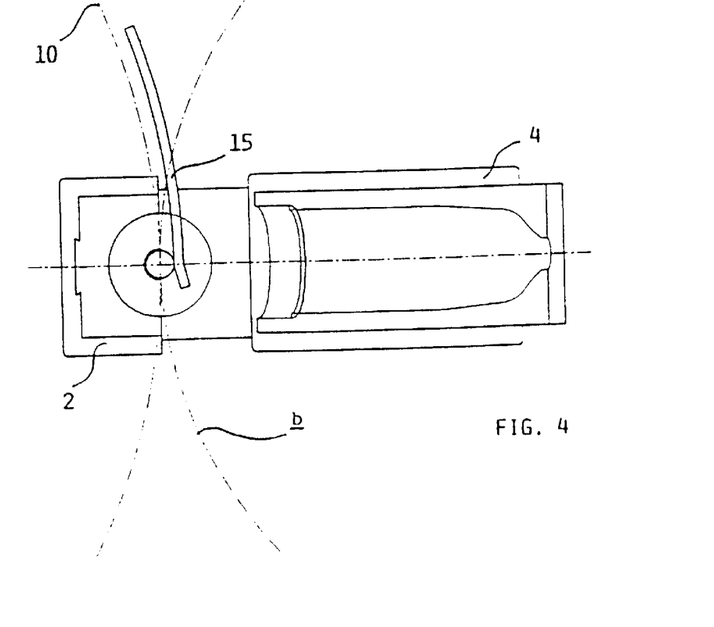
FIG. 4 is again a schematic view of the path, as seen from above, followed by a preform to enter and to come out of a pair of half-moulds according to the present invention.

In this connection, a look should be taken at the illustrations appearing in FIGS. 3 and 4. In particular, the illustration in FIG. 3 can be seen to show, in an extremely schematic manner, a top view of a path a followed by the preform, which is then moulded into a finished container, with respect to two half-moulds 21 and 22 according to the prior art (and therefore both movable) as shown in an open state thereof. From this Figure it can be readily noticed that path a must include a deep sloping pattern in order to enable the preform to first slide into the half-moulds and then move out therefrom as a finished container.

As compared with such a situation, the illustration appearing in FIG. 4 shows, again in a schematic manner, a corresponding top view of a path b followed by the preform, which is then moulded into a finished container, with respect to the fixed half-mould 2 and the moving half-mould 4. Although sketched in a rather simplified form, this illustration does not fail to immediately stress the point that the path b of the preform runs along an arc of circumference without any apparent diversion, or anyway a curvilinear trajectory without any point of inflection that is likely to slow down the movement of the preform/container along the path thereof or to add to the complexity of the construction of the motion control organs.

Figure 7:
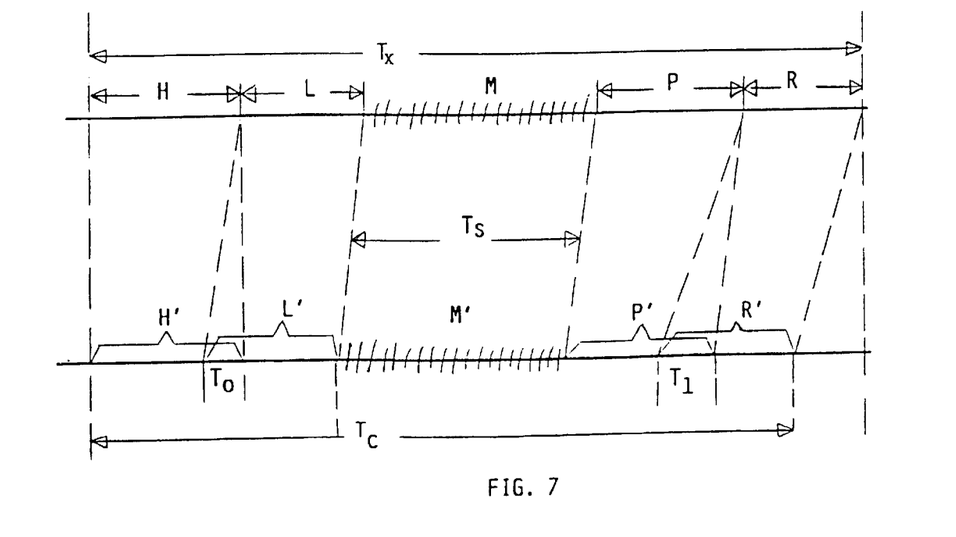
FIG. 7 synthetically illustrates a comparison between two diagrams representing on a horizontal scale the time requirements for carrying out a preform moulding phase according to the prior art and the present invention, respectively.

The line portions indicated at H, L, M, P and R in the diagram of FIG. 7 respectively show the preform insertion time, the half-mould closing time, the blow moulding time (dashed line), the half-mould re-opening time, and the finished container removal time, according to the prior-art.

On the contrary, with the process according to the present invention, owing essentially to the closing phase of the moving half-mould occurring partially at the same time as the preform insertion phase, as well as the opening phase of the same moving half-mould occurring partially at the same time as the finished container removal phase, a reduction in the overall cycle-time of the blow moulding tools can be obtained.

Since the above cited improvement allows for preform insertion phase H' to partially overlap closing phase L' of the sole moving half-mould, such a time during which the two phases are carried out simultaneously is identified as time $T^o$ which must necessarily be deducted from the overall cycle time. Furthermore, after the related blow moulding phase M', which has necessarily an unaltered duration, the opening phase P' of the moving half-mould is carried out. Even in this case, the possibility exists for the subsequent removal phase R' of the finished container to be caused to start earlier, by a tune T', before the mould is fully open, so that this partial overlapping of the opening phase P' of the moving half-mould and the removal phase R' of the finished blow-moulded container again brings about a further reduction in the overall cycle time by such period during which the phases are overlapping, ie. by the above cited time T'.

In practice, the total cycle time is reduced from a value $T_x$ indicated in FIG. 7 to a lower value $T_c$, since $T_c=T_x-T^o-T^1$.

Only a slight mention is made here of the fact that the actual blow moulding time $T_s$, which is also identified by a dashed portion in both diagrams of FIG. 7, is common to and unaltered for both blow moulding processes, so that it is not affected, ie. modified, by the present invention.

However, the advantages brought about by the present invention do not end here. In fact, a further improvement of the invention itself can be easily obtained in the manner that is described below with particular reference to FIGS. 1 and 2.

Referring to FIG. 1, it can be noticed that the introduction of the preforms in the blow moulding half-moulds, ie. the exclusive movement of the preforms towards the half-moulds, can be accomplished through just a partial opening of the moving half-mould 4, ie. when the opening angle is an angle $\ell$ that is smaller than the maximum opening angle. On the contrary, this is not possible in those cases in which both half-moulds are movable, owing to the particular kinematic mechanisms that would be needed, as anyone skilled in the art is well aware of.

This furthermore leads to the advantage of the overall plant being capable of adjustment to the length of the preforms, since it can be easily appreciated that shorter preforms require a smaller opening angle and, therefore, shorter mould insertion times. Similarly, as better illustrated in FIG. 2, the movement for the removal of the finished blow-moulded container can be started before the moving half-mould is fully opened, provided that the trajectory S of the lower edge of the same container does not interfere with the moving half-mould.

Figure 5:
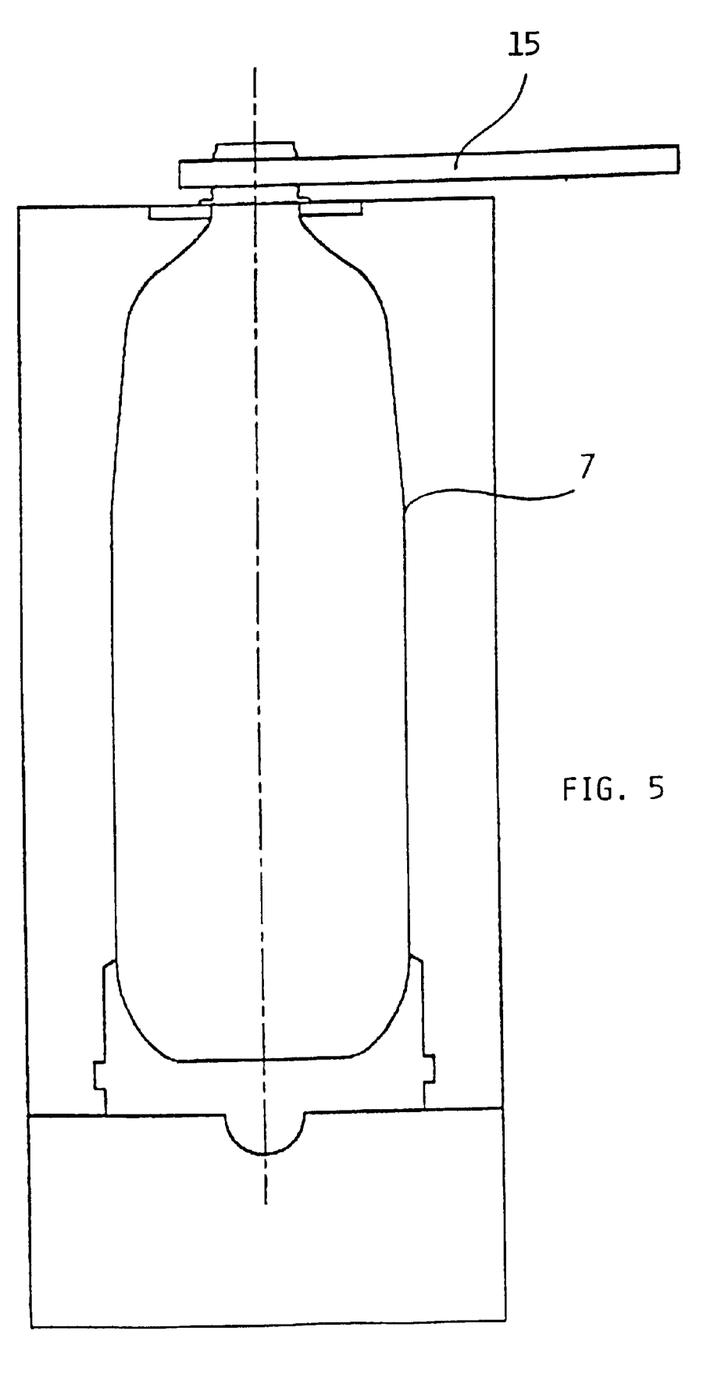
FIG. 5 is a vertical front view of the half-moulds in their opened state, at the exact moment when the blow-moulded container starts to be removed therefrom.

A further advantageous improvement of the present invention lies in providing an appropriately curved guide element 15, illustrated in FIGS. 4 and 5, arranged in a stable manner in such position as to be able to intercept the path of the preform neck from the trajectory b, and to assist it in its movement of insertion in the respective cavity of the corresponding fixed half-mould 2.

As far as the technical improvements in the organs controlling the movement of the moving half-mould are concerned, reference should be made to FIGS. 8 through 12, as well as the corresponding schematics appearing in FIGS. 8A through 12A. The latter can be seen to symbolically represent the fundamental points of application of the action and reaction forces on the organs of the plant, the vectors representing such forces, and the direction of action thereof.

Figure 8:
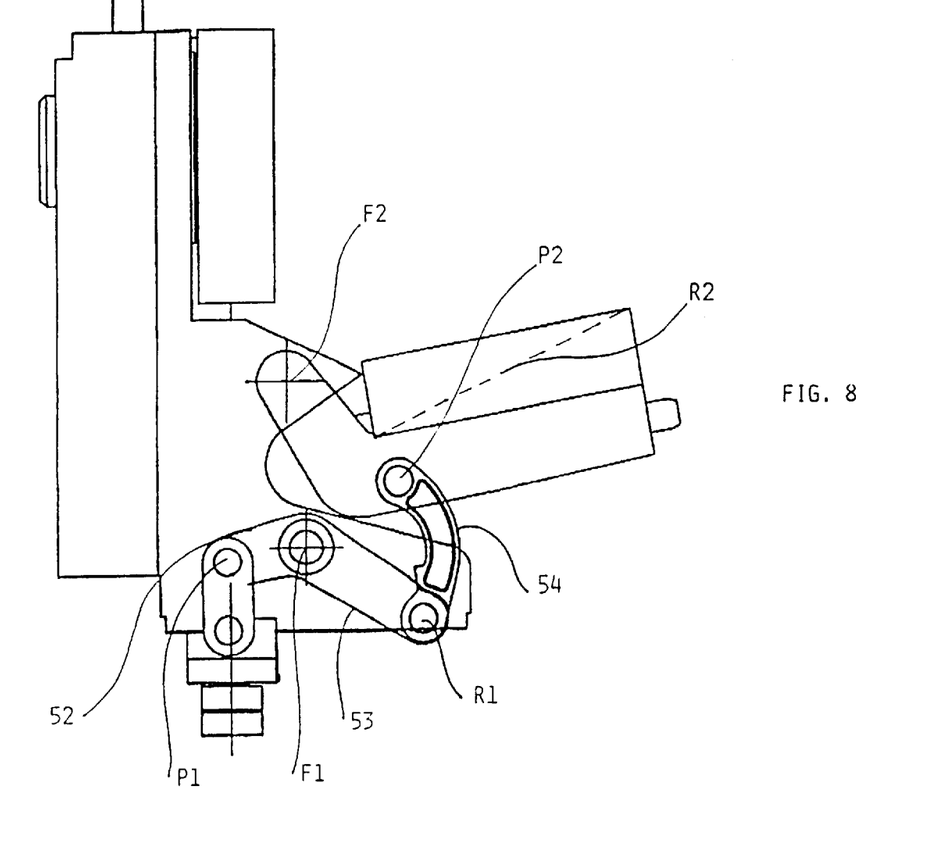
FIGS. 8 through 12 are views of positions of the moving half-mould, and the related actuation organs, from a fully open to a fully closed position thereof.
Figure 8A:
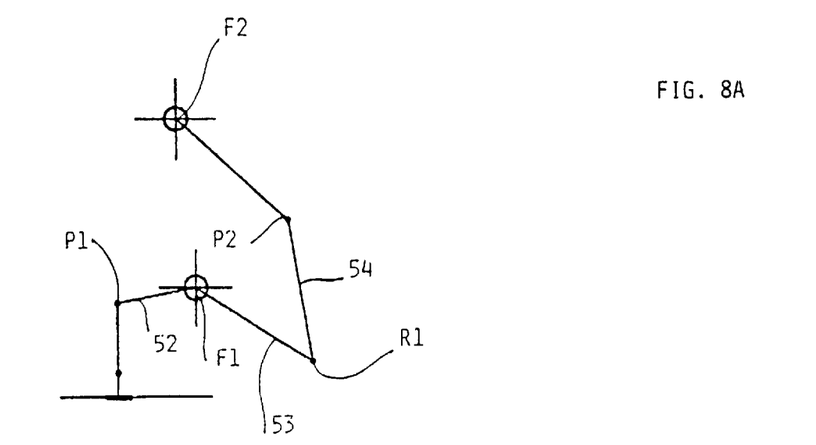

From the illustrations in the above cited Figures it can be noticed that the actuation organs of the moving half-mould 4 comprise:

a first class lever provided with arms 52 and 53 separated by a fulcrum F1, whose power and resistance points are located at the extreme ends of said two arms, ie. at P1 and R1, respectively;

a third class lever provided with respective arms 55 and 56, a respective fulcrum F2, and respective power and resistance points at P2 and R2;

a rigid connecting member 54 that links the resistance point R1 of said first class lever with the power point P2 of the third class lever, the resistance and power points being pivotally connected to the extreme ends of the connecting member 54;

an actuating member 51 provided with two end portions, the first one of which is connected to the power point P1 of the first class lever.

The fulcra F1 and F2 of the first class lever and the third class lever, respectively, are applied pivotally on respective distinct points of a structure 60 that is integral with or firmly joined to the fixed half-moulds. Furthermore, the moving half-mould 4 is applied on the arm 56 of the third class lever opposite to the related fulcrum F2 with respect to the corresponding power point P2.

The second extreme end 57 of said actuating member 51 is adapted to be movably actuated by a moving member 58 on a plane that is orthogonal to the axis of rotation of the fulcrum F1 of the first class lever.

The whole assembly of levers, connecting members and actuating members is adapted to move, clearly in a synchronous and coherent manner, since each moving member is linked to another member, between two respective extreme positions, in which one of such extreme positions corresponds to the full-open position (FIGS. 8, 8A and 12) of the moving half-mould, whereas the other one of said extreme positions corresponds to the full-closed position (FIG. 12, 12A and 16) of the same half-mould.

Figure 13:
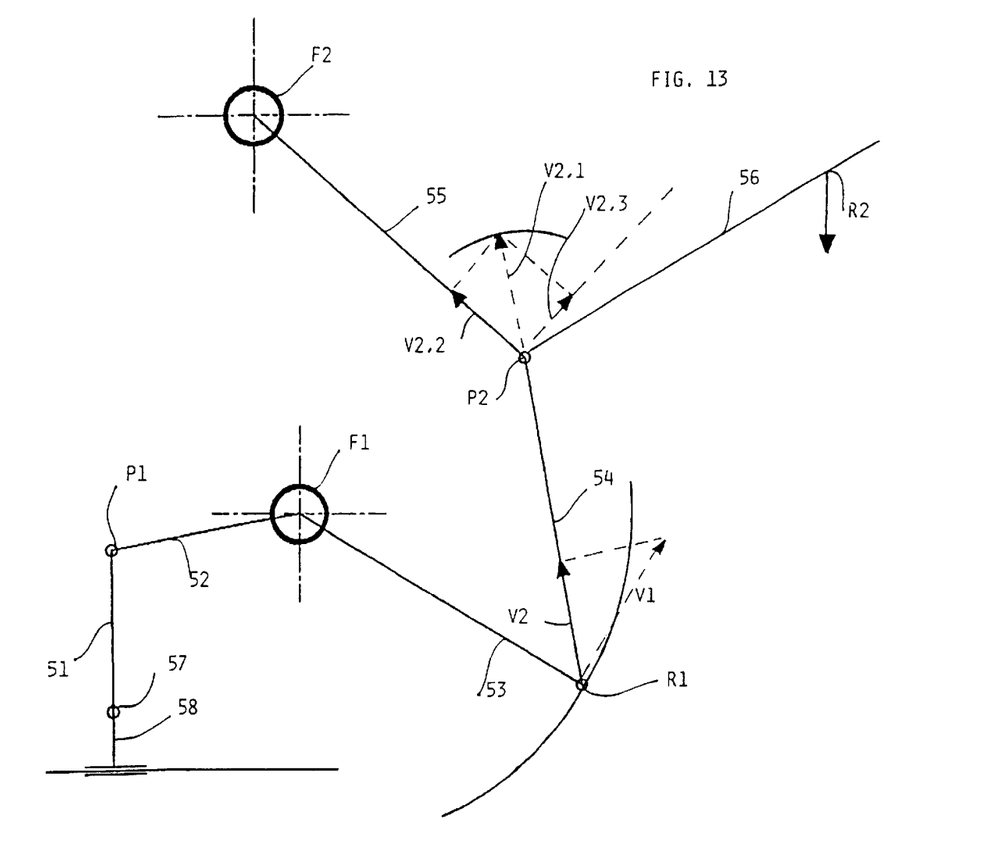
FIG. 13 is a schematic view of the positions of fundamental point vectors and force vectors acting on the actuation organs of FIG. 8, with the mould in an open state.

Referring now to FIG. 13, which illustrates the condition of the mould assembly in its fully open position, it can be noticed that when the second extreme end 57 of the actuating member 51 is urged to start moving in the direction in which the moving half-mould 4 is caused to close, the vector V1 of the force transmitted from the point of resistance R1 of the first class lever to the rigid connecting member 54 has a component V2 in the direction of action on the connecting member, ie. along the straight line joining R1 with P2, wherein the component V2, if considered as being applied on the point of power P2 of the third class lever, indicated at V2,1 in the Figure, may be in turn broken down into two mutually orthogonal components, one of which, ie. the one indicated at V2,2 in the Figure, is oriented towards F2 and acts so as to only compress the related arm 55, with practically no effect at all within the overall geometry, whereas the other component V2,3 is radial with respect to the arm 55 and therefore acts on the arm 56 supporting the half-mould 4, in such a manner as to cause the third class lever to rotate, thereby causing the moving half-mould to close.

As far as the spatial configuration and the possible components of the force vectors, the lever arms and the other connecting/actuating members, it has practically been found that the most effective and logical arrangement thereof is obtained when all of them are provided on a same plane, in particular on the plane shown in the FIGS. 8 through 12. However, as anyone skilled in the art is capable of readily understanding, the vectors, members and components may also be arranged three-dimensionally, provided that they meet the pre-condition of their projections or components on a given, suitable plane reflecting the subsequent conditions illustrated in the Figures.

Figure 9:
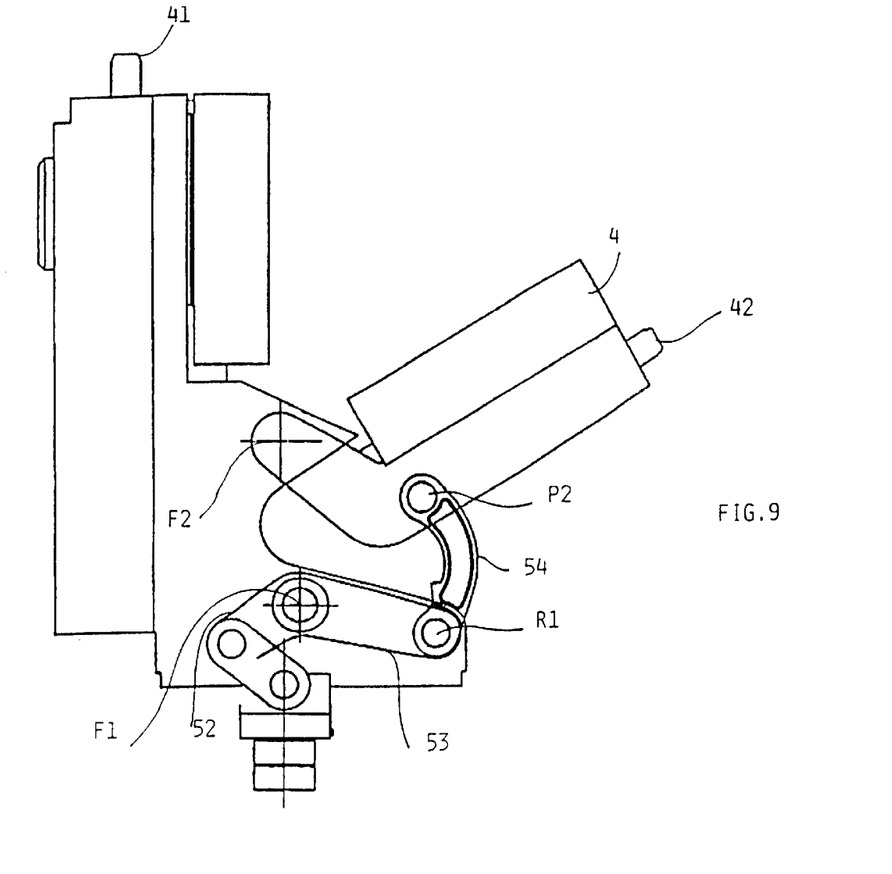
Figure 9A:
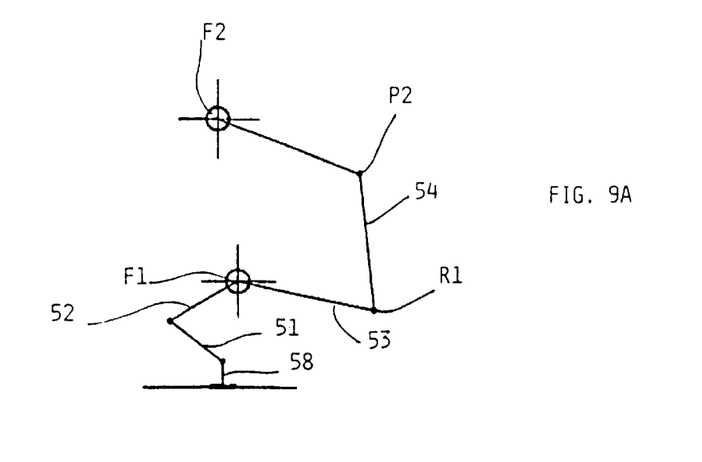
Figure 10:
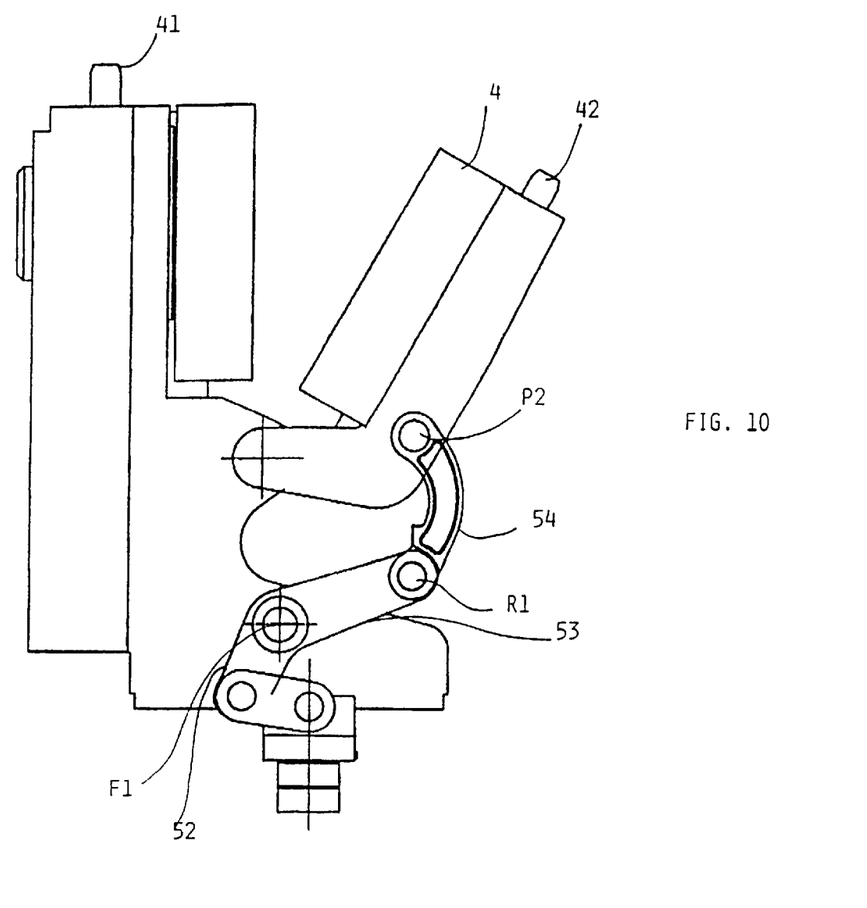
Figure 10A:
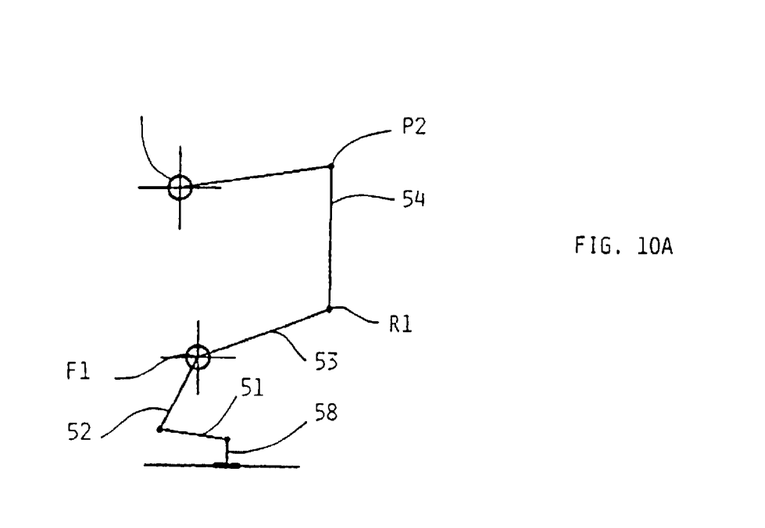
Figure 11:
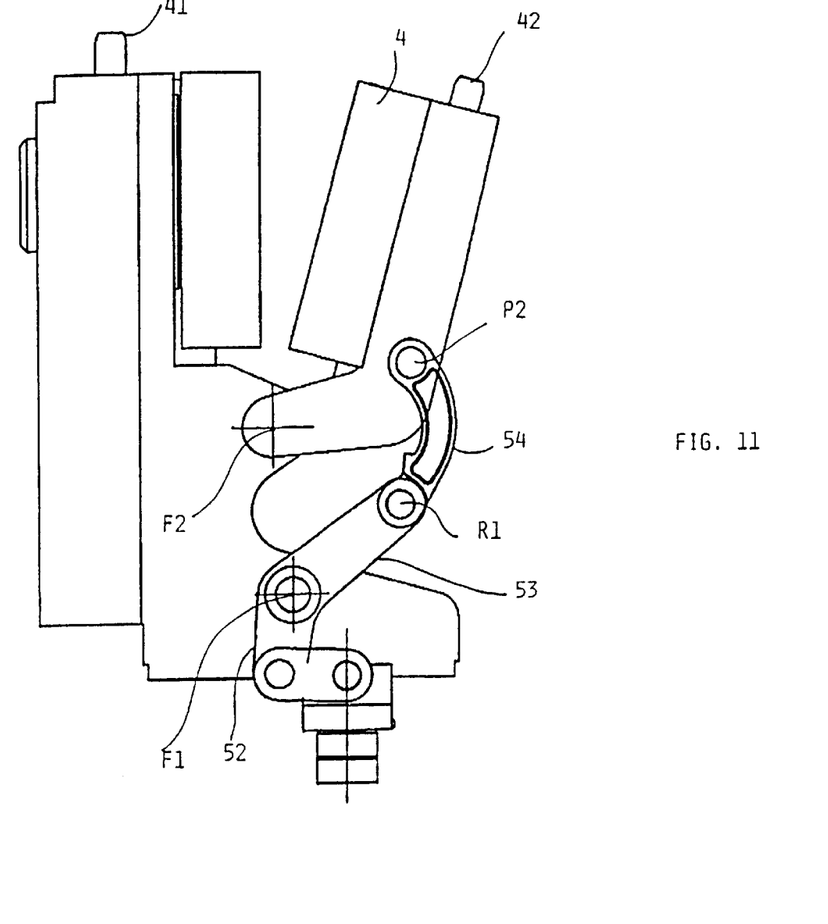
Figure 11A:
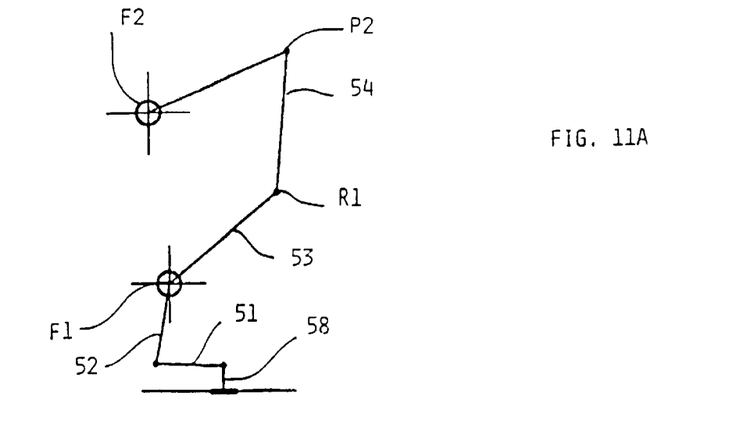

FIGS. 9 through 11 illustrate subsequent dispositions of the whole assembly of levers and connecting and actuating members, along with the respective vectors, corresponding to some subsequent positions of the moving half-mould 4 as it is moved into closing. They are, anyway, readily understandable by those skilled in the art, so that no further explanation needs to be given here in this connection.

Figure 12:
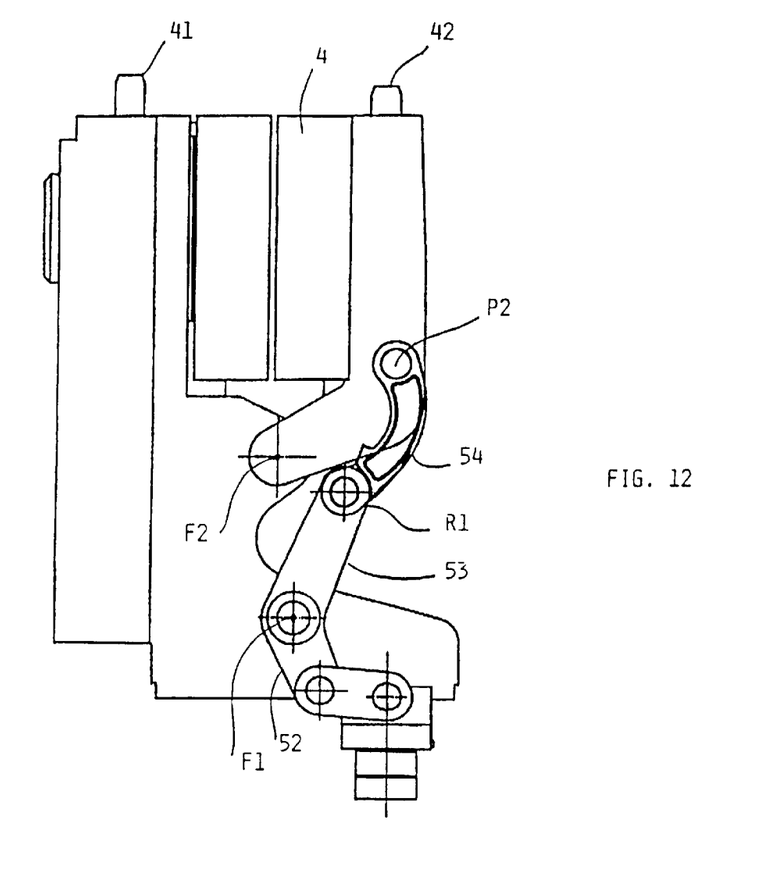
Figure 12A:
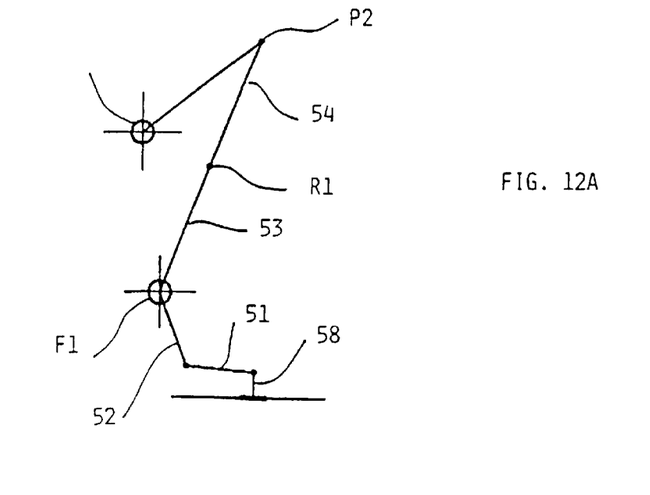

FIGS. 12 and 12A represent the situation when the moving half-mould is fully closed. This is a quite particular situation since, further to representing a kind of end-of-stroke point it also represents the condition in which the "toggle effect" shows up in all of its effectiveness. In other words, this is the condition in which the clamping force of the half-mould reaches its peak, ie, is maximized, while the angular displacement of the half-mould is at a minimum. Use is anyway made also of other means, further to this fact, in order to ensure a fully stable clamping of the half-mould.

Reference should be made now to FIG. 12: the point of resistance R1 of the lever 52, 53 is in an articulated arrangement with respect to the connecting member 54, so that the arm 53 and the connecting member 54 are capable of rotating with respect to each other. However, a further rotation thereof beyond a pre-established position is prevented by the presence of a mechanical or positive retainer (not shown) that really acts as a toggle, ie. enables two levers hinged on an extreme end thereof to rotate with respect to each other only up to a certain angle and not any further.

The geometric configurations and the dimensions of the various members and components involved are so defined as to make sure that, when such a limit stop position is reached, this position also coincides with both the full-closed condition of the moving half-mould against the respective fixed half-mould and the particularly favourable condition created by the three geometrical sites identified by P2, R1 and F1 being aligned, as is shown in FIG. 12A.

Figure 14:
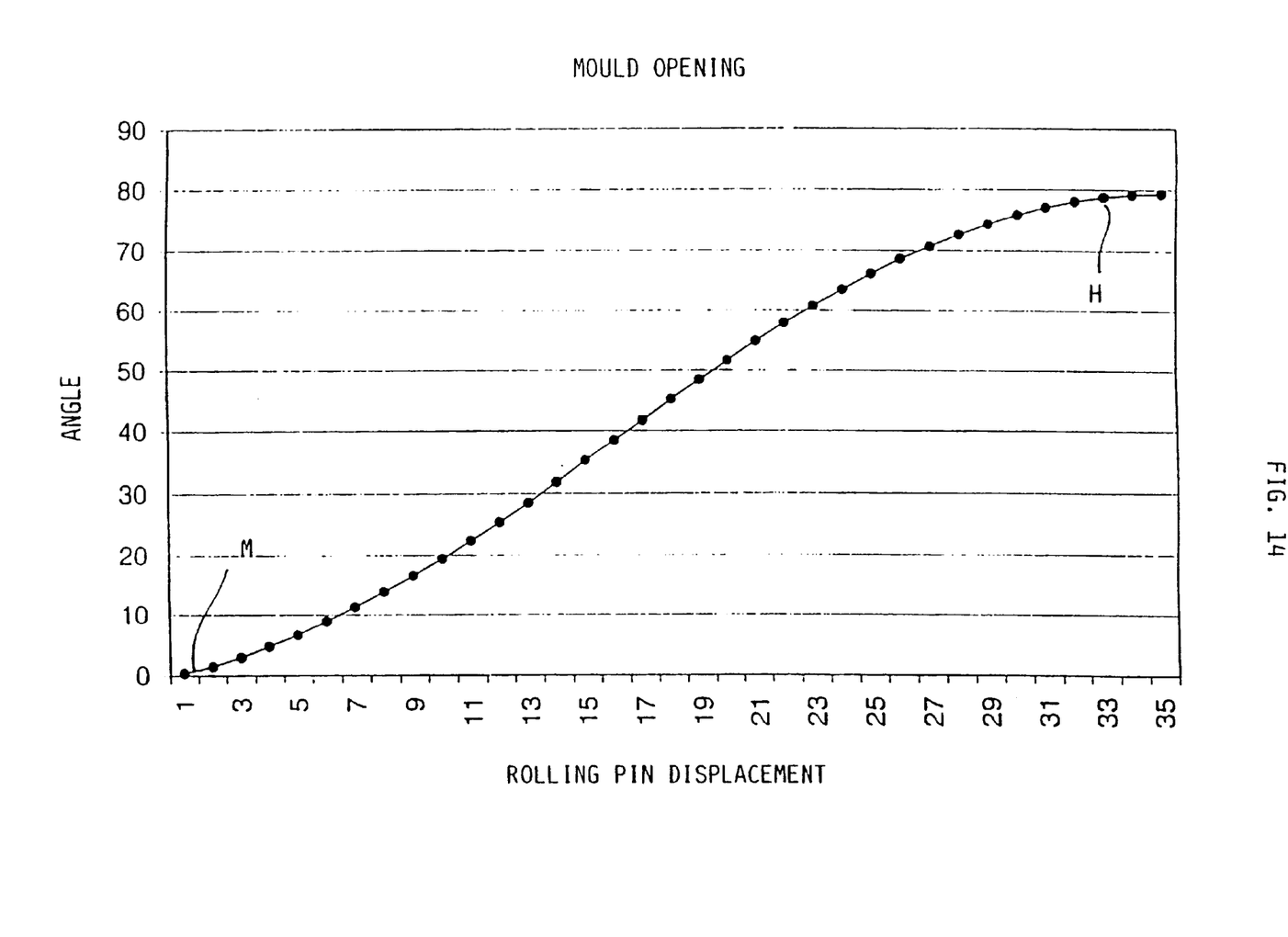
FIG. 14 is a diagrammatic view of position characteristics of the moving half-mould with respect to the position of an actuation pin from a reference position thereof.

The advantageous character of such a circumstance has already been hinted at above and lies essentially in the fact that, in the final portion of the closing path covered by the moving half-mould, the force that is produced and can therefore be used to close and clamp the half-mould, is at its maximum, ie. reaches a peak. In this case in fact, as is most clearly shown in FIG. 14 illustrating the opening or closing angle of the moving half-mould in accordance with the progressive displacement of the moving member 58, or rolling pin, the most favourable condition is obtained in -new of making the best possible use of the so-called "toggle effect", the condition being reached through the illustrated combination and association of the described leverages. In a more detailed manner, FIG. 14 can be noticed to emphasize how, in correspondence of the portion of curve indicated at M, at a certain progressive displacement of the device or rolling pin 58, whose scale in the lower portion of the Figure is a linear one, a rotation is obtained with a progressively decreasing increment of the angle between the members 54 and 55 until an angle of 0° is eventually reached between the members 54 and 55 in correspondence of a value of approx. 1 in the abscissa.

The particular pattern followed by the curve in correspondence of the above cited point M, which corresponds to the moving half-mould being closed, and also of the point H at the opposite end of the same curve, which corresponds to the full-open position of the half-mould, ensures a movement of the same half-mould with progressively slowed-down accelerations and decelerations towards the respective end-of-stroke positions thereof, until practically a condition of zero acceleration is reached when the half-mould approaches the respective end-of-stroke positions thereof.

Such a moving pattern of the half-mould translates into a number of significant practical advantages, ie. a noticeable reduction in vibrations, the prevention of the moving half-mould from bumping when moving into its end-of-stroke positions, and the possibility for the moving device to be actuated with the help of simple, reliable and accurate means that are furthermore durable, ie. well resistant to wear-down since they are not subject to the action of "forces".

This condition is further strengthened by the fact that, immediately upon the moving half-mould having so been moved into its fully closed position, the same half-mould is automatically clamped in such a position with the help of such supplementary external means as readily conceivable by all those skilled in the art, the means being linked to the pins 41, 42 that are firmly joined with the fixed half-mould and the moving half-mould, respectively.

It will of course be appreciated that when it is stated that the geometrical sites identified by P2, R1 and F1 are aligned, as is shown in FIG. 12A, this is meant to be understood in the broadest sense of the word, since this is actually intended to mean that, in order to ensure the desired "toggle effect", it is sufficient for the axes of rotation of the pins centered on P2, R1 and F1 to be not only parallel, but also arranged on the same plane.

The continuous operation of the described assembly for alternatingly opening and closing the moving half-mould can be obtained through a corresponding to-and-fro movement of the moving device or roiling pin 58. Such a movement can be easily obtained by means of a continuously rotating cam device adapted to control the movement and the position of the rolling pin in full synchronization with all other devices, mechanisms and actuators that altogether ensure the various phases for opening the half-mould, introducing the preform, closing the half-mould, blow moulding the preform, opening the half-mould and simultaneous removal of the finished container.

A further advantage of the present invention, as exemplified in the illustrated embodiment thereof, derives from the fact that if, as just stated above, the alternating to-and-fro movement of the moving device or rolling pin 58 is actuated by two rotating cams, preferably on the same vertical axis of rotation of the carousel 10 in FIG. 6, the limited weardown effect that unavoidably takes place between the actuating surfaces of the rotating cams and the rolling pin has only a very limited impact on the opening and closing accuracy of the moulds. This fact brings about the remarkable benefit deriving from the possibility for the maintenance or re-adjustment of the cams and therewith associated organs to be carried out at quite extended intervals, without incurring any loss in processing precision.

A confirmation of the fact that the weardown effect of the cams, and possibly also of the associated rolling pin or moving device, has only a very limited impact on the precision of the end-of-stroke positions of the moving half-mould, can be simply obtained by again having a look at FIG. 14, in which it can in fact be observed that the condition actually occurs in which, in front of a certainly non-negligible displacement, ie. oscillation of the rolling pin about the points M and H, the angle of rotation of the moving half-mould is almost nil and practically negligible. As a result, if such an oscillation is due to weardown, this practically has no significant effect on the precision of the end-of-stroke positions of the moving half-mould.

What is claimed is:

1. Apparatus for blow moulding hollow plastic bodies comprising:

a plurality of pairs of mutually joinable half-moulds capable of being opened and closed, linked to an appropriate rotary apparatus carrying said half-moulds, support devices for carrying preforms corresponding to said half-moulds, a preform feeding mechanism adapted to supply an orderly sequence of preforms held at an appropriate blow-moulding temperature into the respective pairs of half-moulds associated to said rotary apparatus, which are to this purpose kept in their opened position, a retrieval device adapted to remove the finished container from the respective pair of half-moulds after the opening thereof, an opening and closing mechanism adapted to close the half-moulds after the passage thereof through the position of the preform feeding mechanism, and to open them before the passage thereof through the position of the finished-container removal mechanism, characterized in that said pairs of half-moulds are constituted by a fixed half-mould and a moving half-mould that is capable of being opened from and closed against said fixed half-mould, said fixed half-moulds being arranged in a substantially vertical position, and the respective moving half-mould being adapted to be closed by accomplishing a substantially rotary movement about a horizontal axis of rotation, characterized in that said opening and closing mechanism of any of said moving half-moulds comprises:

a first class lever and a third class lever, a structure firmly associated to said fixed half-moulds, a connecting member that joins the point of resistance of said first class lever with the point of power of said third class lever, said resistance and power points being pivotally connected to the extreme ends of said connecting member, an actuating member provided with two extreme ends, of which the first extreme end is connected to the power point of said first class lever, the fulcra of said first class lever and said third class lever being pivotally applied on respective distinct points of said structure firmly associated to said fixed half-moulds, and said moving half mould being applied on the arm of said third class lever which is opposite to the related fulcrum with respect to the corresponding power point.

2. Apparatus according to claim 1, characterized in that the second extreme end of said actuating member is adapted to be forced by a moving device into displacing on an orthogonal plane with respect to the axis of rotation of the fulcrum of said first class lever.

3. Apparatus according to claim 1, characterized in that said levers and said connecting and actuating members are adapted to move between two respective extreme positions, in which one of said extreme positions corresponds to the full-open position of said moving half-mould, whereas the other of said extreme positions corresponds to the full-closed position of said moving half-mould.

4. Apparatus according to claim 3, characterized in that when said second extreme end of said actuating member is driven in the sense of starting the closing displacement of said moving half-mould from the full-open position thereof, a vector of the force transmitted from said resistance point of said first class lever to said connecting member has a component in the direction of said connecting member which, when applied on to said power point of said third class lever, has in turn a respective second component that is oriented so as to induce a rotation of said third class lever in the closing direction of said moving half-mould.

5. Apparatus according to claim 1, characterized in that in said fully closed position of said moving half-mould, said power point and said fulcrum of said third class lever, as well as said resistance point of said first class lever are either aligned or the respective axes of rotation are parallel and lie on the same plane.

6. Apparatus according to claim 1, characterized in that said moving device is adapted to be driven into alternatingly displacing between two extreme positions corresponding to the conditions in which said moving half-mould is fully open and fully closed, respectively, by means of a cam device rotating about an axis that is orthogonal to the axes of rotation of said two levers.

7. Apparatus according to claim 1, characterized in that in said full-closed position thereof there is provided a retaining device adapted to prevent said moving half-mould from further rotating beyond said full-closed position.

8. Apparatus according to claim 1, characterized in that selectively actuatable means are provided which are adapted to prevent said moving half-mould from rotating back towards the open position from said full-closed position.

9. Apparatus according to claim 1, characterized in that, in the position of maximum opening of said moving half-mould, said power point of said first class lever is aligned with said second extreme portion of said actuating member and with said moving member.

10. Apparatus according to claim 9, characterized in that said moving member is allowed to be dragged along a rectilenear translational movement only.

11. Apparatus according to claim 10, characterized in that said rectilenear translational movement is orthogonal to the direction of the alignment among:

said power point said second extreme portion of said actuating member and said moving member, when said moving half-mould is in the position of maximum opening.

12. Apparatus according to claim 9, characterized in that it comprises two different toggle levers.

13. Apparatus according to claim 26, characterized in that one of said toggle levers is fully extended when the moving half-mould is fully opened, and the other of said toggle levers is fully extended when the moving half-mould is fully closed.

14. Apparatus according to claim 10, characterized in that it comprises two different toggle levers.

15. Apparatus according to claim 11, characterized in that it comprises two different toggle levers.

16. Apparatus according to claim 14, characterized in that one of said toggle levers is fully extended when the moving half-mould is fully opened, and the other of said toggle levers is fully extended when the moving half-mould is fully closed.

17. Apparatus according to claim 15, characterized in that one of said toggle levers is fully extended when the moving half-mould is fully opened, and the other of said toggle lever (53, R1, 54) is fully extended when the moving half-mould is fully closed.

18. Apparatus according to claim 2, characterized in that said levers and said connecting and actuating members are adapted to move between two respective extreme positions, in which one of said extreme positions corresponds to the full-open position of said moving half-mould, whereas the other of said extreme positions corresponds to the full-closed position of said moving half-mould.

19. Apparatus according to claim 18, characterized in that when said second extreme end of said actuating member is driven in the sense of starting the closing displacement of said moving half-mould from the full-open position thereof, a vector of the force transmitted from said resistance point of said first class lever to said connecting member has a component in the direction of said connecting member which, when applied on to said power point of said third class lever, has in turn a respective second component that is oriented so as to induce a rotation of said third class lever in the closing direction of said moving half-mould.

* * * * *